Figure 1:
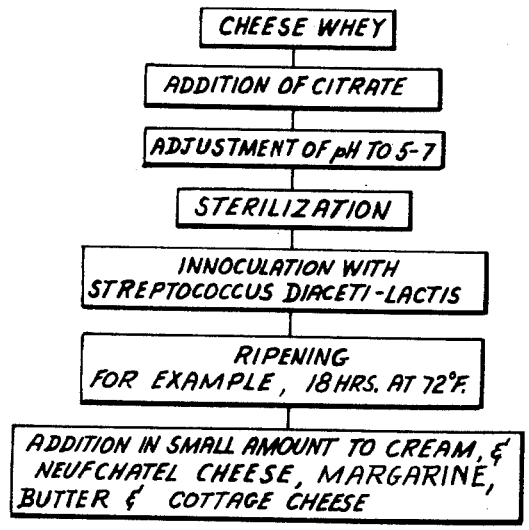

Aug. 7, 1962     E. LUNDSTEDT     3,048,490

AROMA PROCESS FOR DAIRY PRODUCTS AND THE RESULTING PRODUCT

Filed April 6, 1961

GROWTH PATTERNS OF A L.CITROVORUM/S.LACTIS/S.CREMORIS STARTER (1) AND THE SAME STARTER CONTAINING A STRAIN OF S. DIACETI-LACTIS (2).

Inventor
Erik Lundstedt
by Roberts, Cushman & Grover,
Att'ys.

3,048,490
AROMA PROCESS FOR DAIRY PRODUCTS AND THE RESULTING PRODUCT
Erik Lundstedt, Needham, Mass., assignor to H. P. Hood & Sons, Inc., Charlestown, Mass., a corporation of Massachusetts
Filed Apr. 6, 1961, Ser. No. 101,287
19 Claims. (Cl. 99—116)

This invention relates to methods, cultures and medium for improving the flavor and aroma of butter, margarine, cream cheese, Neufchatel cheese, cottage cheese, and creamed cottage cheese. This application is a continuation-in-part of application Serial No. 24,784, filed April 26, 1960, now abandoned.

Objects of the present invention are to provide the aforementioned cheeses, butter and margarine with improved flavor and aroma, and with more uniform flavor and aroma from sample to sample. A further object is to provide a method whereby a troublesome waste product in the form of cheese whey is converted to a valuable product.

Under current practice, the flavor and aroma of creamed cottage cheese, prepared from quality milk and cream under strict sanitary practices, depends upon the quality and properties of the milk starters or butter cultures used in its manufacture. At present, milk starters which grow uniformly and produce aroma in cottage cheese are the exception rather than the rule. Moreover, many of the currently used Leuconostoc strains used in starters are sensitive to variations in the chemical composition of the milk so that they gradually lose their ability to produce aroma in finished cottage cheese.

The present invention is based upon the discovery that the organism *Streptococcus diacetilactis*, by modified processing techniques, can be utilized to produce creamed cottage cheese of consistently good aroma and flavor without effecting the acidity of the finished cottage cheese and more economically than by any method heretofore known. *S. diacetilactis* cultures are known and may be obtained, for example, from the culture collection of the National Institute of Research of the University of Reading, England, a sample of which has been obtained by the American Type Culture Collection and assigned Accession No. 13,675.

Milk starters containing *Streptococcus diacetilactis* have been heretofore known but, when added to milk according to conventional techniques, usually produce sizable amounts of carbon dioxide gas and therefore produce a gassy cottage cheese curd. Gassy curd breaks up in the cheese vats and also retains moisture to a degree which makes drainage of curd very difficult and nearly impossible in automatic draining systems. Such starters in conventional use produce less curd and undesirable curd particles without producing, on a consistent basis, better aroma in cottage cheese than the more conventional *L. citrovorum-lactis* starters. Consequently manufacturers of cottage cheese have avoided the use of such *S. diacetilactis*-containing starters.

In accordance with this invention, cultures of or containing *Streptococcus diacetilactis* are inoculated into citrate enriched cheese whey, preferably cottage cheese whey, ripened for a suitable period of time, and the resulting medium is added in small amount to conventionally prepared cottage cheese. The foregoing ripened cottage cheese whey culture is supersaturated with carbon dioxide gas and is of such taste and smell as to be useless according to conventional judgment. However, it has been found that the addition of small amounts of such cultured material to creamed cottage cheese will, within the three days normally required to market such cheese and under reduced temperature conditions at which no bacterial growth takes place, produce a cottage cheeese of consistently excellent aroma and flavor.

Figure 2:
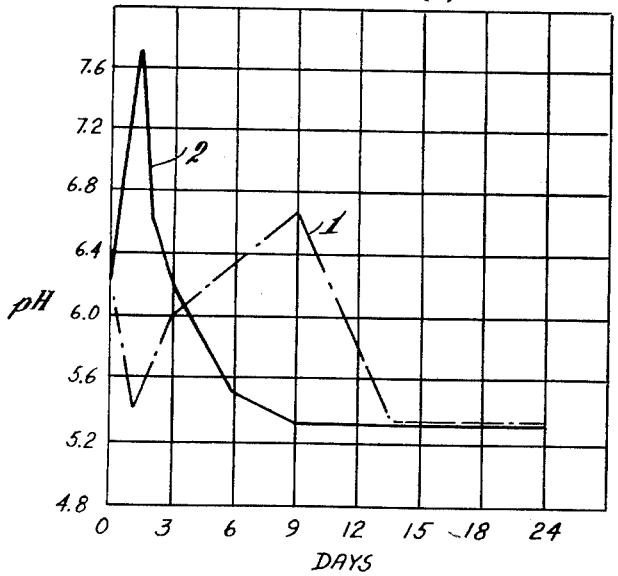

Referring to the accompanying drawing, FIG. 1 is an illustrative flow chart of the present process, while FIG. 2 is a graph showing the pH changes (on a $CO_2$-free basis) with time of ripening for two cultures, one of which contains *S. diacetilactis*.

The initial step is to provide a cheese whey as the necessary medium for growth of the bacteria. While cottage cheese whey is greatly preferred, it has been found that other wheys can be employed. Useful wheys are the lactic acid wheys produced by bacterial souring of milk to a ripened pH of from 4.8 to 4.3. In addition to cottage cheese whey, useful examples include cream cheese whey and Neufchatel cheese whey. Rennet whey and whole or skim milk are not satisfactory.

Whey contains soluble proteins which are denatured and coagulated by heat, as in the sterilization subsequently described. While the proteins cause no particular harm and may be left in the whey, if desired, coagulation renders the whey cloudy and it is preferred to remove the proteins by heat coagulation and separation, for example, by filtering, centrifuging, or settling and decanting. This is preferably done prior to citration but can be done at any stage prior to inoculation.

Citrate is added to the base medium in an amount equivalent to about 1.0 to 4.3 parts by weight of anhydrous citric acid per 100 parts of whey. This citrate addition can comprise citric acid or any of the monovalent cation salts thereof which are suitable for use in food, with or without water of hydration. For example, commercial sodium citrate pentahydrate in the amount of 2 to 8 parts by weight per 100 parts of whey can be used and is equivalent to the amount of anhydrous citric acid stated above. 2.7 parts anhydrous citric acid or 5.0 parts sodium citrate pentahydrate are preferred.

The pH of the citrated whey is then adjusted to the range of about 5.0 to 7.0 with about 6.0 being preferred. This can be accomplished, for example, with sodium hydroxide, sodium carbonate, etc. by conventional neutralization procedures.

While the citrated whey is now suitable for further processing, it can optionally and advantageously be spray dried for storage as hereinafter described. The citrated whey powder can be reconstituted with water.

The citrated whey is then pasteurized or sterilized. Any suitable heat treatment can be used which will assure that no organisms are present to propagate in competition with the subsequently added bacteria culture. Suitable procedures comprise autoclaving at not more than 10 pounds steam pressure for 15 minutes, or heating for one hour at 190° F.

The citrated whey medium, after sterilization and cooling, is then inoculated with *Streptococcus diacetilactis* organisms, either pure, as preferred, or in the presence of other starter bacteria. Strains should be employed with high citrate fermenting and low lactose fermenting abilities. This inoculation can comprise from a few parts of a fully developed culture per million parts of citrated whey to about 5.0 parts culture by weight per 100 parts citrated whey, with about 2.0 parts per hundred being preferred. The culture is sufficiently developed if it has or contains sufficient carbon dioxide to produce foam on agitation. The amount of this inoculation is not particularly critical since the bacteria multiply rapidly in the medium within 18 hours at 72° F.

The medium is then ripened at a temperature between about 70° F. and 90° F. with 80° F. being the optimum for bacterial growth, but 72° being satisfactory and desirable for convenient use of existing creamery equipment and practices. The time of ripening can vary from about 15 hours to about 7 days; 18 hours at 72° F. with a 2% bacterial culture inoculation has been found satisfactory. The object of the ripening is to produce sufficient fermentation and bacterial growth to provide an adequate amount of flavor and aroma precursor materials in the culture.

In FIG. 2 of the drawing, curve 1 shows the pH changes (CO₂-free basis) with time, of a *L. citrovorum/S. lactis/S. cremoris* starter culture at 72° F. of a 2% culture inoculation in cottage cheese whey to which 5% of sodium citrate pentahydrate was added. Curve 2 represents the same change except that *Streptococcus diacetilactis* was added to the starter culture of curve 1. It has been found that the shape of curve 2 is characteristic of cultures containing *Streptococcus diacetilactis* either as a pure culture or in admixture with other starter bacteria. While the rate of change may vary, the pH of the cultures after CO₂ removal increases to a maximum in the vicinity of neutrality and thereafter decreases. This curve is a means of identifying *S. diacetilactis*-containing cultures. Culture useful according to this invention must produce a characteristic curve such as shown in curve 2. All citrate fermenting *S. diacetilactis* cultures will do so if kept and cultured in the citrated whey medium herein described.

The pH values shown in FIG. 2 are obtained by taking samples from the ripening culture at appropriate time intervals, removing CO₂ by air agitation, and thereafter determining the pH. In the actual ripening culture, with the CO₂ present, the pH remains relatively constant at about 6.0 which is optimum for the conversion of pyruvic acid to alpha-aceto-lactic acid as hereinafter described.

Growth of a particular citrate fermenting culture should be continued until approximately the maximum pH, as measured on a CO₂-free basis, is achieved. At this time sufficient of the desired precursor materials are present. The ripened culture may now be refrigerated for storage or may be left at ripening temperature for approximately one week without undue deterioration or loss of precursor material. The maximum pH also coincides with approximately the maximum production of gas (CO₂) so that sufficient ripening of culture can also be judged by agitation which will produce foam. Similarly, the titratable acidity of the ripening culture, calculated as lactic acid and on a CO₂-free basis will decrease, for example, from about 0.3 percent in the original inoculated culture mixture to less than 0.1 percent as the pH increases.

The culture mixture, prepared and ripened as above described, can be used immediately or refrigerated for as long as one month. It is added to creamed or uncreamed cottage cheese prepared by otherwise conventional techniques, in an amount sufficient to produce from about 1 to 4 parts per million diacetyl in the cheese after about 3 days. In practice it has been found that from about ¼ to about 1% addition of the ripened culture mixture, with about ½% being preferred, will give diacetyl within the desired range. It is conveniently added to the cold cream dressing prior to its addition to the cottage cheese curd in making the final product.

Flavor and aroma are judged organoleptically while diacetyl is measured by the conventional method of Parker and Elliker. Diacetyl is not the only flavor and aroma product desired and present since addition of pure diacetyl does not give the same result. However, diacetyl is important and provides a convenient basis for test and standardization.

It is believed that the flavorable flavor and aroma developed by the present invention is a secondary rather than a primary effect. By this it is meant that the final flavor and aroma ingredients are not primarily present in that form in the ripened medium as it is added to the creamed cottage cheese. Rather, they are developed in the cheese from precursor materials present in the citrate fermented culture. It is believed, that the generally accepted opinion that acetylmethylcarbinol is the precursor material which is oxidized to diacetyl, is not correct. The precursor is now thought to be alpha-aceto-lactic acid (alpha-acetoxy propionic acid) which is formed by citrate fermentation and converted to diacetyl by enzymes carried by the bacteria and operating in the presence of dissolved oxygen in the water phase. This conversion is believed to be optimum at about pH 5±0.4. It is believed that the efficacy of the present invention is based on the fact that large amounts of the necessary precursor materials and enzymes are present in the citrated whey culture of *S. diacetilactis* such that the desired diacetyl and related flavor and aroma compounds are produced in the cheese with a very small addition thereto. The small amount of citrated whey culture required is not only economical but avoids any appreciable effect on the acidity or composition of the cheese.

The following is a specific example of carrying out the present invention:

Sodium citrate pentahydrate was added to cottage cheese whey, 5.0 parts by weight, per 100 parts whey. The pH was adjusted with 2 N sodium hydroxide to 6.0 and the citrated whey heated at 190° F. for one hour and cooled to 72° F. The heat treated citrated whey was then inoculated with 2% of a developed *S. diacetilactis* culture and ripened for 18 hours at 72° F. The ripened culture was then refrigerated (38–42° F.) for storage. One-half percent, by weight, of this ripened culture was added to conventionally prepared creamed cottage cheese, mechanically agitated for five minutes and stored at 38° F. Excellent organoleptically-determined flavor and aroma were developed. Diacetyl, in parts per million, was developed in the cheese (at 38° F.) as follows:

| Days | 2 | 6 | 17 | pH (17 days) |
|---|---|---|---|---|
| Test (total diacetyl) | 2.68 | 4.08 | 6.16 | 5.0 |
| Control | 0.84 | 0.84 | 1.52 | 5.0 |

The cottage cheese of the above example was in marketable condition for the full 17 days which is a longer period than now standard for conventional cottage cheese.

The ripened citrated whey culture of *S. diacetilactis* can also be usefully added to butter, margarine, cream cheese or Neufchatel cheese to enhance the flavor and aroma thereof. The quantity to be added is best determined according to the taste and aroma desired. In general, the amount for the cheeses is similar to that contained in cottage cheese while the butter and margarine arom is developed after the addition to the serum of from 1 to 5% based on the serum weight, of the ripened citrated why culture. Since butter and margaine ordinarily contain much less air than cottage cheese, the flavor and aroma are developed therein in a period of about three weeks rather than three days. However butter and margarine normally require that much time to reach the market. Since the amount of air is usually limited in the butter and margarine, the amount of diacetyl produced therein is limited so that excess cultured additive is not likely to produce excess aroma. The culture can be added to the butter or margarine serum at any convenient stage before working or texturizing, provided it is not subjected to temperatures in excess of about 120° F.

In providing flavor and aroma in butter and margarine, the culture additive is soluble in and will be contained within the water phase. Since the conversion of the precursor material of the culture in the presence of air occurs at an optimum pH of 5.0 ± 0.4, the water phase should be aerated and adjusted to provide this pH. Where the phases are not separated, as in cream, the pH of the combination will be the same as the pH of the serum. This pH is preferably adjusted with citric or lactic acid. The culture additive should be added to aerated serum at a temperature not exceeding 120° F., and before working or texturizing the final product. It is essential that the serum be aerated. In ordinary churning of cream the motion and whipping action of the revolving churn accomplish the desired result, but in continuous butter and margarine production where the serum is incorporated into the melted butterfat, auxiliary air must be blown into the serum before its incorporation into the fat. Salt should be 1% or preferably less.

By way of example the development of aroma in butter by the use of a citrated cottage cheese whey starter may be demonstrated as follows:

Cream containing 33% fat was pasteurized to 180° F., held for 5 minutes, and slowly cooled to 64° F. To the serum portion of the cooled cream was added 0.29% by weight citric acid monohydrate crystals while the cream was agitated. The cream did not curdle and after 5 minutes the pH of the cream was 5.0. The cream was cooled to 50° F. and, in this case, held overnight. The next morning the cream was still pH 5.0, the acidity calculated as lactic was 0.35%, and the temperature 54° F. The cream was divided into 3 lots: (1) Control without a citrated whey culture; (2) with 1 percent of a citrated whey culture of S. diacetilactis calculated on the serum weight; and (3) with 5% of culture. Butters were churned (1) 42 minutes; (2) 47 minutes; and (3) 53 minutes. The pH of all buttermilks was 5.07 and temperature 57° F. The butters were not washed, but were salted with 0.5% salt. Twenty minutes after salting, the butters were worked dry to waxy consistencies and the moistures were: (1) 14.3%; (2) 14.5%; and (3) 14.7%. The butters were stored in lined and lacquered 30-lb. tins for 30 days at 38° F., and samples removed each week for analysis. The following table summarizes the results of the experiment:

*The Formation of Diacetyl in Parts per Million in Butter the Serum of Which Contains 1 and 5 Percent Addition of a Citrated Whey Culture of S. Diacetilactis*

[Storage temperature of butter was 38° F.]

| Days | Lot 1 (control) | | Lot 2 (1% culture) | | Lot 3 (5% culture) | |
|---|---|---|---|---|---|---|
| | Diacetyl | Aroma | Diacetyl | Aroma | Diacetyl | Aroma |
| 7 | 0 | none | 0.18 | none | 1.28 | v. slight. |
| 14 | 0 | none | 0.20 | none | 1.58 | slight. |
| 21 | 0 | none | 0.24 | none | 1.68 | Do. |
| 30 | 0 | none | 0.30 | none | 2.10 | distinct. |
| pH after 30 days | 5.03 | | 5.1 | | 5.1 | |

Citrated cottage cheese whey cultures of S. diacetilactis can also be enhanced in their ability to produce aroma in cheese, butter and margarine. The addition to the whey of heat undenaturable proteins in the form of peptides from animal or plant sources will stimulate the growth and citric acid fermentation of S. diacetilactis in citrated cottage cheese whey.

By way of example, dried pancreas extract, Procheez of the Wilson Laboratories, Chicago, Illinois, was added to the citrated cottage cheese whey in various amounts. The preparation of this extract is explained in an article by McAnelly and Speck in the Journal of Bacteriology, vol 73, No. 5, May 1957, pp. 676–681. The culture media were sterilized, cooled and inoculated with 2% of a citrated whey culture of S. diacetilactis and incubated for 18 hours at 72° F. The following table indicates the influence of the added peptides on the ability of the cultures to enhance the aroma formation in creamed cottage cheese on a 1% level and after 4 days at 38° F.

*The Influence of Peptides (Pancreas Extract Solids) on the Aroma Producting Properties of S. Diacetilactis Citrated Cottage Cheese Whey Cultures*

| Citrated Whey | Diacetyl, p.p.m. | Percent increase | pH | Aroma |
|---|---|---|---|---|
| Plus 0.00% peptides | 3.44 | 0 | 5.05 | High. |
| Plus 0.02% peptides | 3.88 | 12.7 | 5.02 | Do. |
| Plus 0.04% peptides | 4.32 | 25.6 | 5.01 | Do. |
| Plus 0.08% peptides | 4.72 | 37.2 | 5.03 | Do. |
| Plus 0.16% peptides | 5.76 | 67.4 | 5.02 | Very High. |
| Plus 0.32% peptides | 6.04 | 75.5 | 5.05 | Too Strong. |
| Control | 0.16 | | 5.00 | Bland. |

The addition of 0.16% of dried pancreas extract seems to be the optimum since double this amount only increases the aroma formation from 67.4% to 75.5% in comparison to the plain citrated whey culture.

In addition to the enhanced flavor and aroma, the present process has a further advantage in providing a beneficial use for cottage cheese whey which has been heretofore a troublesome by-product. Cottage cheese whey often cannot be disposed of in sewage systems nor can it be added to rivers or lakes. Heretofore it has been discarded by dumping from tank trucks at suitable locations and at considerable expense. By the present process this by-product is utilized. While it can be used as is, it is preferable to spray dry the whey for storage. Cottage cheese whey alone cannot be spray dried, but it has been discovered that if the citrate is added thereto, the combination can readily be spray dried to a stable powder by methods now employed for making powdered non-fat milk. It is preferred to adjust the pH to the desired value prior to drying. Also, it is preferable, for storage, to separate the soluble proteins from the whey before drying and to sterilize. The powder is reconstituted for use as desired, about 9 parts water being required per one part of powder. The reconstituted whey is then cultured as described above.

It should be understood that the foregoing description is for the purpose of illustration only and that the invention includes all modifications and equivalents which fall within the scope of the appended claims.

I claim:

1. The method of making a flavor and aroma additive for dairy products, which comprises providing a sterile citrate-enriched cheese whey at a pH of 5 to 7, thereafter inoculating the medium with citrate-fermenting Streptococcus diacetilactis and ripening to ferment the citrate.

2. The method according to claim 1, wherein the citrated cheese whey comprises a cheese whey to which a citrate selected from the group consisting of citric acid and its food-approved, monovalent cation salts have been added in an amount equivalent to about 1.0 to about 4.3 parts anhydrous citric acid per 100 parts of whey.

3. The method according to claim 2, wherein said citrated whey is inoculated with from a few parts Streptococcus diacetilactis culture per million parts citrated whey to about 5.0 parts culture per 100 parts by weight of citrated whey.

4. The method according to claim 2, wherein said inoculated cheese whey is ripened between about 70° F. and 90° F. until sufficient carbon dioxide is formed to foam the mixture when agitated.

5. The method according to claim 2, wherein said inoculated whey is ripened between 5 hours and 7 days at 70° to 90° F.

6. The method according to claim 2, wherein said cheese whey is cottage cheese whey.

7. The method according to claim 1, further characterized by adding said ripened additive to a product selected from the group consisting of cottage cheese, cream cheese, Neufchatel cheese, butter and margarine.

8. The process according to claim 7, wherein said cheese is creamed cottage cheese, said ripened additive being added thereto in an amount sufficient to produce about 1 to about 4 parts per million of diacetyl within about three days.

9. The process according to claim 8, further characterized by adding from about ¼% to 1% by weight of the ripened additive to cottage cheese.

10. The method of preparing a flavor and aroma additive for dairy products which comprises providing a sterile citrated whey medium at a pH of about 6±1, said medium comprising a whey selected from the group consisting of cottage cheese whey, cream cheese whey and Neufchatel cheese whey, and an added citrate selected from the group consisting of citric acid and its food approved, monovalent cation salts, said added citrate compound being present in an amount equivalent to about 1.0 to 4.3 parts anhydrous citric acid per 100 parts of whey, inoculating the medium with citrate-fermenting *Streptococcus diacetilactis* bacteria and ripening the mixture at about 70 to 90° F. for a time sufficient to produce foam on agitation.

11. The method according to claim 10, further characterized by adding the ripened mixture to cottage cheese in an amount sufficient to produce from about 1 to 4 parts per million diacetyl in the cheese within about three days at refrigeration temperature.

12. The method of making a flavor and aroma additive for dairy products which comprises providing cottage cheese whey enriched with a citrate selected from the group consisting of citric acid and its food-approved monovalent cation salts, said citrate being added in an amount equivalent to about 1.0 to about 4.3 parts anhydrous citric acid per 100 parts of whey, adjusting the pH to 6±1, sterilizing, inoculating the citrated whey with *Streptococcus diacetilactis* bacterial, and ripening the inoculated whey between about 70° F. and 90° F. until sufficient carbon dioxide is formed to foam the mixture when agitated.

13. The method of preparing cottage cheese with enhanced flavor and aroma which comprises adding about 5 parts by weight of sodium citrate pentahydrate to 100 parts of cottage cheese whey, adjusted the pH to about 6, sterilizing, inoculating the mixture with about 2% of a fully developed culture of citrate-fermenting *Streptococcus diacetilactis*, ripening the mixture at about 72° F. for about 18 hours, adding about ½% by weight of the ripened culture to cottage cheese, and storing said cheese at refrigeration temperatures.

14. The method of preparing butter and margarine products with enhanced flavor and aroma which comprises providing a citrate-enriched cheese whey, adjusting the pH to about 5 to 7, sterilizing, inoculating the mixture with a fully developed culture of citrate-fermenting *Streptococcus diacetilactis*, ripening the mixture, adjusting the water phase of the product to a pH of 5±0.4, adding the ripened culture to the water phase having a temperature below 120° F. in the presence of oxygen, and thereafter texturizing the finished product.

15. A flavor and aroma additive for dairy products which comprises the ripened ferment of sterile citrate-enriched cheese whey and citrate-fermenting *Streptococcus diacetilactis* bacteria.

16. A flavor and aroma additive for dairy products which comprises the ripened ferment of sterile citrate-enriched cottage cheese whey and *Streptococcus diacetilactis* bacterial.

17. A stage product for the production of a flavor and aroma additive for dairy products which comprises a forcibly dried citrated cheese whey, said citrated whey comprising a cheese whey enriched by addition of a citrate selected from the class consisting of citric acid and its food-approved, monovalent cation salts.

18. A stage product for the production of a flavor and aroma additive for dairy products which comprises a spray dried mixture of cottage cheese whey and a citrate selected from the group consisting of citric acid and its food-approved, monovalent cation salts, said powder being capable of reconstitution and of producing a pH of between 5 and 7 on dissolution in neutral water in the proportion of about 1 part of powder to 9 parts of water, said citrate being present in an amount equivalent to about 1.0 to 4.3 parts by weight anhydrous citric acid per 100 parts of whey.

19. The method of making a reconstitutable stage product for production of a flavor and aroma additive to dairy products which comprises adding a citrate selected from the group consisting of citric acids and its food-approved, monovalent cation salts to bacterially-produced cheese whey in an amount equivalent to about 1.0 to 4.3 parts anhydrous citric acid per 100 parts of whey, providing a pH of between 5 and 7, and spray drying the mixture.

References Cited in the file of this patent

UNITED STATES PATENTS 2,971,847    Babel et al. _____ Feb. 14, 1961

OTHER REFERENCES

"A Method for Standardizing the Biacetyl Content of Creamed Cottage Cheese," by Mather et al., reprinted from Journal of Dairy Science, June 1959, vol. XLII, No. 6, pages 1045 and 1046 (pp. 1 and 2 of the reprint).

"Studies on the Flavor of Creamed Cottage Cheese," by Mather et al., reprinted from Journal of Dairy Science, May 1959, vol. XLII, No. 5, pages 809 and 810 (pp. 1 and 2 of the reprint).

"The Utilization of Whey: A Review," by Webb et al., Journal of Dairy Science, vol. 31, No. 2, February 1948, pp. 145–147, 151, 152, 154 and 155.